(12) United States Patent
Tan

(10) Patent No.: US 7,824,285 B2
(45) Date of Patent: Nov. 2, 2010

(54) BICYCLE REAR DERAILLEUR

(75) Inventor: Boon Sze Tan, Singapore (SG)

(73) Assignee: Shimano (Singapore) Pte. Ltd., Jurong Town (SG)

( * ) Notice: Subject to any disclaimer, the term of this patent is extended or adjusted under 35 U.S.C. 154(b) by 286 days.

(21) Appl. No.: 11/641,904

(22) Filed: Dec. 20, 2006

(65) Prior Publication Data

US 2008/0153639 A1 Jun. 26, 2008

(51) Int. Cl.
*F16H 59/00* (2006.01)
(52) U.S. Cl. ............................................. 474/80; 474/82
(58) Field of Classification Search .................. 474/80, 474/82
See application file for complete search history.

(56) References Cited

U.S. PATENT DOCUMENTS 4,051,738 A    10/1977   Dian
4,235,118 A *  11/1980   Huret ............................ 474/82
4,279,605 A     7/1981   Egami
4,494,944 A *   1/1985   Coue ............................ 474/82
5,836,844 A *  11/1998   Yoshida ........................ 474/80
5,931,753 A *   8/1999   Ichida .......................... 474/82
6,290,621 B1 *  9/2001   Ichida .......................... 474/80
2004/0116222 A1* 6/2004  Shahana et al. ............... 474/82

FOREIGN PATENT DOCUMENTS

BE      416 055 A      7/1936
FR      2 849 825 A1   7/2004
JP      49-42646 U     4/1974

* cited by examiner

*Primary Examiner*—Michael R Mansen
*Assistant Examiner*—Robert T Reese
(74) *Attorney, Agent, or Firm*—Global IP Counselors, LLP

(57) ABSTRACT

A bicycle rear derailleur includes a base member, a movable member movably coupled to the base member and a chain guide coupled to the movable member. The base member is configured to be mounted to a bicycle portion. The base member includes a metal plate that is a one-piece member forming a stroke adjustment mounting structure, an angular position adjustment mounting structure and an outer casing adjustment mounting structure.

15 Claims, 9 Drawing Sheets

BICYCLE REAR DERAILLEUR

BACKGROUND OF THE INVENTION

1. Field of the Invention

This invention generally relates to a bicycle rear derailleur. More specifically, the present invention relates to a bicycle rear derailleur having a simplified base member.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle rear derailleur.

Typically, a rear derailleur has a base member and a movable member with a chain guide movably coupled to the base member via a linkage assembly. The base member is attached to the frame of the bicycle. The chain guide is configured to move the chain laterally over a plurality of rear sprockets. A spring biases the chain guide to an innermost or outermost position relative to the rear sprockets. A Bowden-type control cable is typically coupled to the rear derailleur and to a conventional shift control device in order to control lateral movement of the chain guide. Pulling the inner wire moves the chain guide against the biasing force of the spring, while releasing the inner wire causes the chain guide to move due to the biasing force of the spring.

The typical rear derailleur usually includes a conventional barrel adjuster mechanism that receives the outer casing of the shift control cable, a conventional stroke adjustment mechanism (e.g. high and low adjustment screws) and/or a conventional angular position adjustment mechanism. These mechanisms are typically coupled directly or indirectly to various parts of the derailleur. In either case, prior derailleurs having such adjustment mechanisms can be relatively complicated, cumbersome and/or expensive to manufacture and assemble due to the number of parts and/or the complexity of the parts needed to properly mount such adjustment mechanisms thereto. Also, the base member of a typical rear derailleur has an internal spring such that the derailleur is mounted in a stationary position relative to the frame during normal use, but can be rotated against the biasing force of the internal spring. This type of base member including an internal spring also requires numerous parts in order to properly support its internal spring between the base member and the frame, further complicating the already relatively complicated structure of typical rear derailleurs.

In view of the above, it will be apparent to those skilled in the art from this disclosure that there exists a need for an improved bicycle rear derailleur. This invention addresses this need in the art as well as other needs, which will become apparent to those skilled in the art from this disclosure.

SUMMARY OF THE INVENTION

One object of the present invention is to provide a bicycle rear derailleur that moves a chain guide between a plurality of lateral shift positions in a smooth and reliable manner for shifting a chain.

Another object of the present invention is to provide a bicycle rear derailleur that is relatively simple and inexpensive to manufacture, assemble and/or install on a bicycle.

The foregoing objects can basically be attained by providing a bicycle rear derailleur, which comprises a base member, a movable member movably coupled to the base member and a chain guide coupled to the movable member. The base member is configured to be mounted to a bicycle portion. The base member includes a metal plate that is a one-piece member forming a stroke adjustment mounting structure, an angular position adjustment mounting structure and an outer casing adjustment mounting structure.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
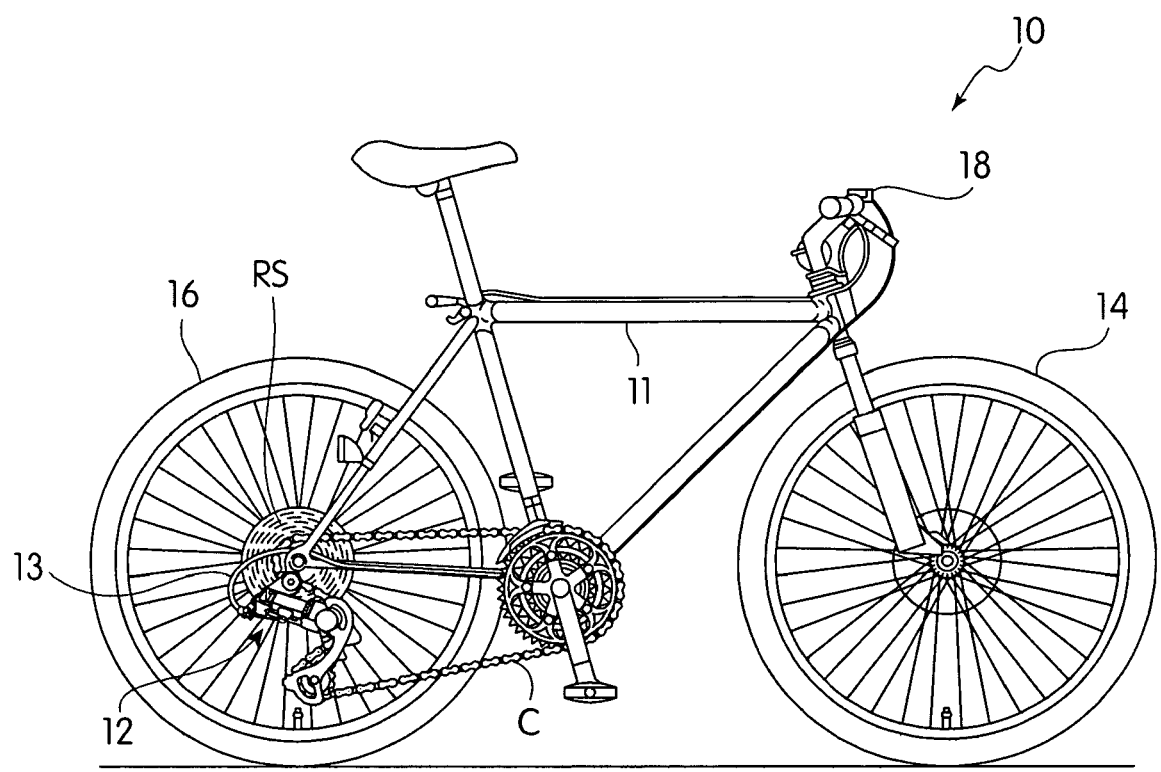
FIG. 1 is a side elevational view of a bicycle equipped with a bicycle rear derailleur in accordance with an embodiment of the present invention.
Figure 2:
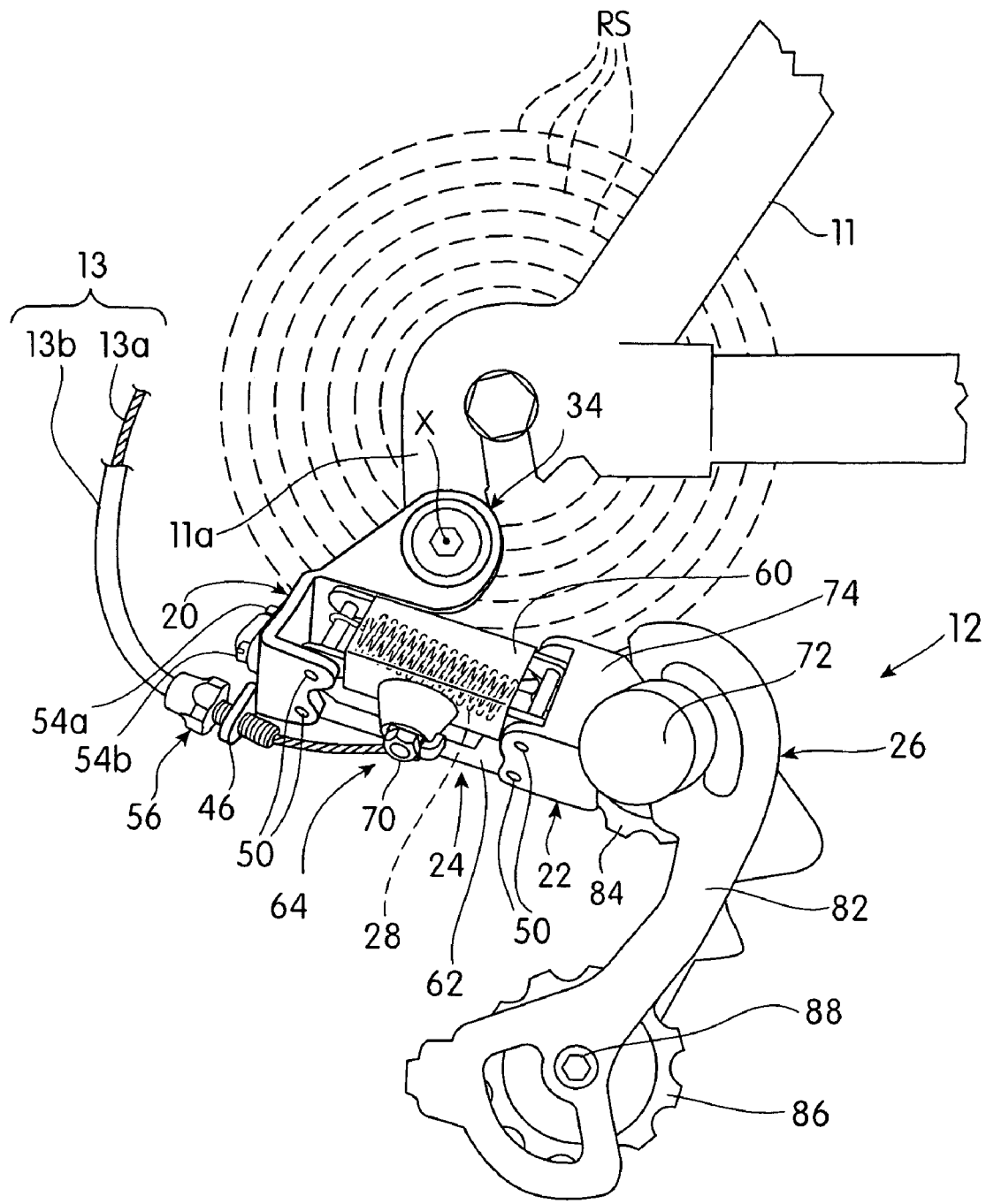
FIG. 2 is an enlarged, outside elevational view of the rear derailleur illustrated in FIG. 1, with only a portion of the bicycle frame illustrated and with the rear sprockets only diagrammatically illustrated for the purpose of illustration.
Figure 3:
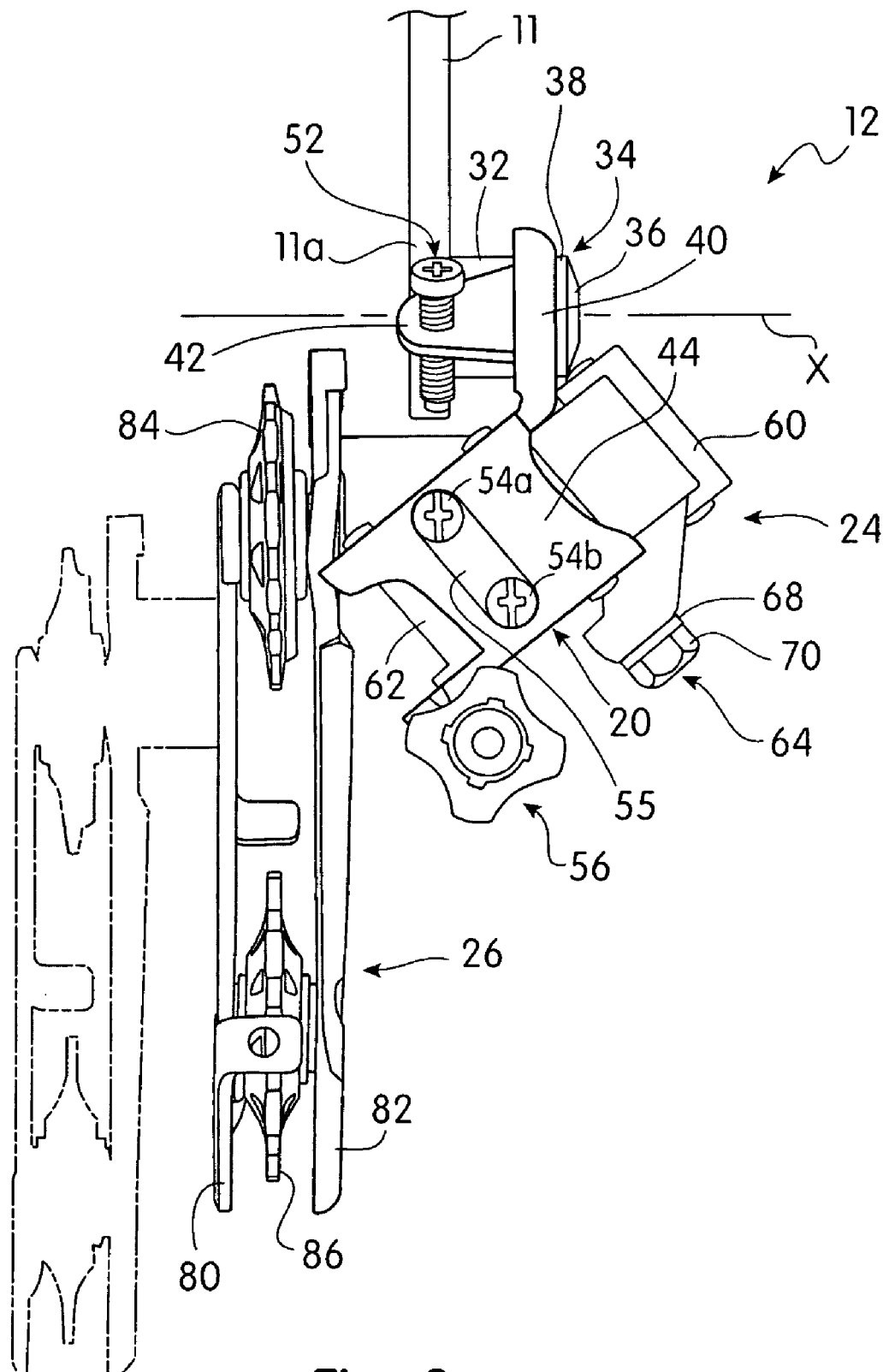
FIG. 3 is a rear elevational view of the rear derailleur and the portion of the bicycle frame illustrated in FIG. 2.
Figure 4:
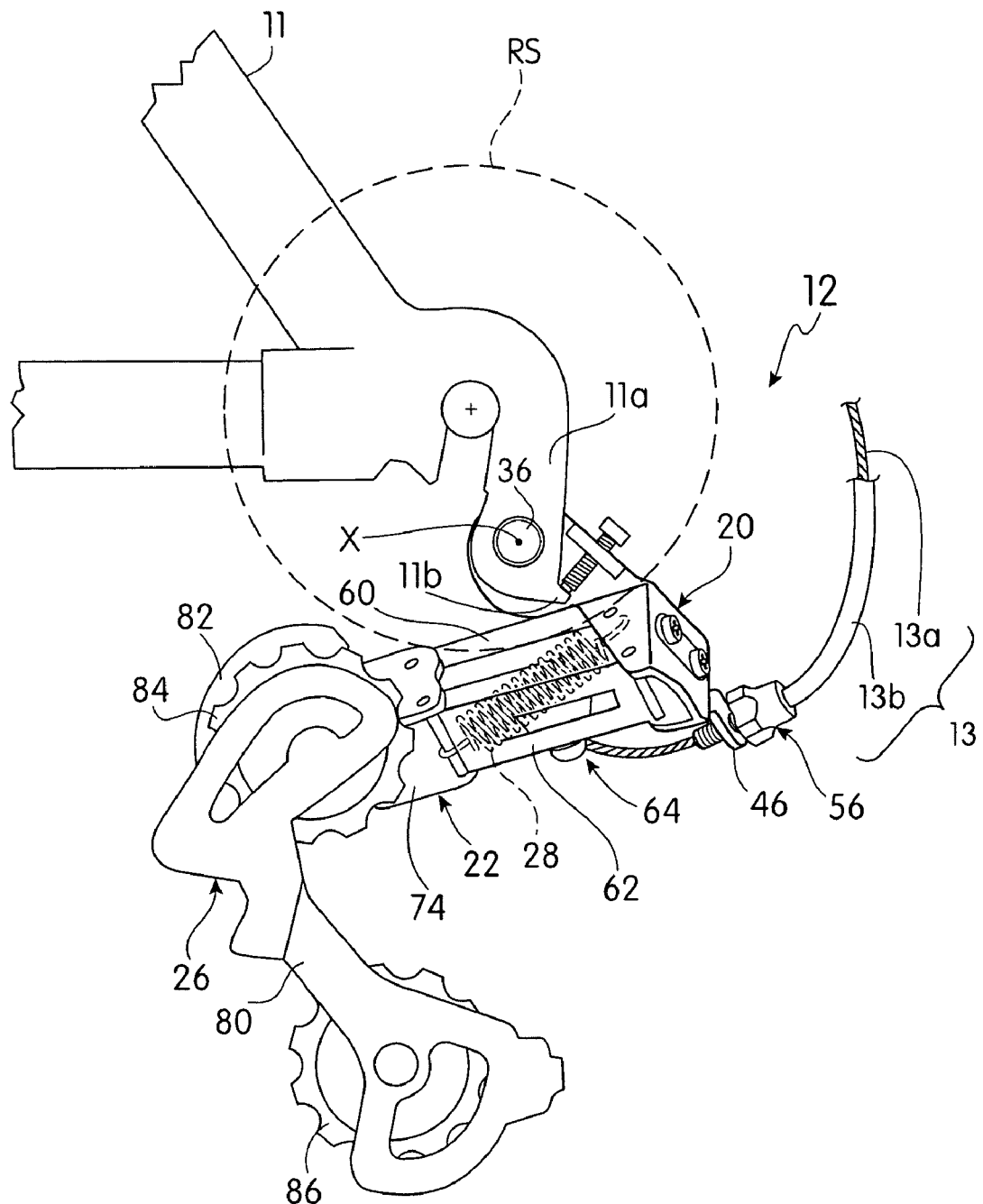
FIG. 4 is an inside elevational view of the rear derailleur and the portion of the bicycle frame illustrated in FIGS. 2 and 3.

Referring initially FIGS. 1-4, a bicycle 10 is illustrated, which is equipped with a bicycle rear derailleur 12 in accordance with one embodiment of the present invention. The rear derailleur 12 in utilizes relatively few parts yet facilitates smooth shifting. Specifically, the rear derailleur 12 has three adjustment devices coupled to a single member, and does not include a biasing member arranged between the rear derailleur 12 and the frame 11 of the bicycle 10, as explained below. The bicycle 10 is conventional, except for the rear derailleur 12. Thus, the bicycle 10 will not be discussed and/or illustrated in detail herein, except as related to the rear derailleur 12 of the present invention.

The bicycle 10 basically includes the frame 11 with front and rear wheels 14 and 16 coupled to the frame 11 in a conventional manner. The right side of the rear triangle of the frame 11 has rear derailleur mounting plate 11a extending downwardly with the rear derailleur 12 directly attached thereto. However, the frame 11 can alternatively be provided with a removable type derailleur hanger (not shown) in a conventional manner without departing from the present invention. The bicycle 10 further includes a conventional rear shift control device 18 mounted on the handlebar to control the rear derailleur 12 via a shift control cable 13. The shift control cable 13 includes an inner wire 13a and an outer casing 13b in a conventional manner. The shift control device 18 is utilized by the rider to selectively pull/release the inner wire 13a to move a chain C laterally over a plurality of rear sprockets RS that are coupled to the rear wheel 16 using the rear derailleur 12. While a mechanical (i.e., cable actuated) derailleur 12 is illustrated, it will be apparent to those skilled in the art from this disclosure that the present invention can be employed in other types of derailleurs such as pneumatic derailleurs, motorized/electrical derailleurs and/or electromechanical derailleurs.

Since the various parts of the bicycle 10 are conventional, except for the rear derailleur 12, the parts of the bicycle 10 will not be discussed or illustrated in detail herein, except as they relate to the rear derailleur 12. Moreover, it will be apparent to those skilled in the art from this disclosure that various modifications can be made to the various components and/or parts of the bicycle 10 without departing from the scope of the present invention.

Figure 5:
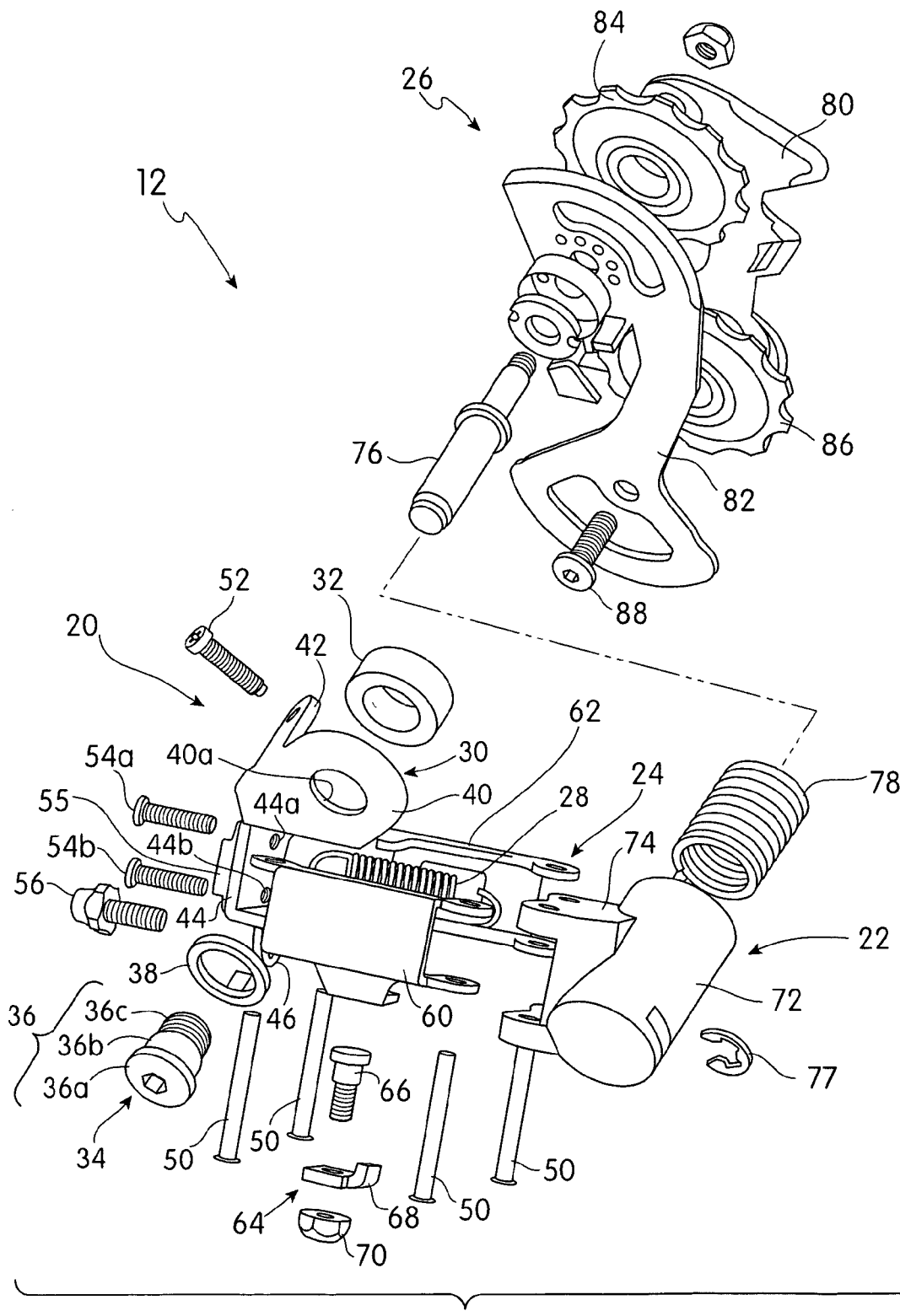
FIG. 5 is an exploded, perspective view of the rear derailleur illustrated in FIGS. 2-4.

Referring now to FIGS. 2-5, the rear derailleur 12 basically includes a base member 20, a movable member 22, a linkage assembly 24, a chain guide 26 and a biasing member 28. Generally, the base member 20 is configured to be mounted to the bicycle 10, while the linkage assembly 24 is coupled between the base member 20 and the movable member 22 to move the chain guide 26 between a plurality of shift positions. Thus, the chain guide 26 is movable between at least one extended position and at least one retracted position as best understood from FIG. 3. The biasing member 28 normally biases the chain guide 26 toward one of the retracted most and extended most positions. In the illustrated embodiment, the base member 20 is fixedly coupled to frame 11 for limited rotational movement about a main pivot axis X, while the biasing member or spring 28 normally biases the movable member 22 and chain guide 26 to the outer most (smallest) of the rear sprockets RS.

The base member 20 basically includes a main body 30, a spacing sleeve or bushing 32 and a fastener 34 utilized to attach the main body 30 and the bushing 32 to the frame 11. The bushing 32 is disposed between a portion of the main body 30 and a derailleur mounting plate or hanger 11a of the frame 11 to space the main body 30 from the derailleur mounting plate 11a of the frame 11. The fastener 34 extends through the main body 30 and the bushing 32, and is attached to the derailleur mounting plate 11a of the frame 11. Preferably, the base member 20 does not include an internal spring or biasing member arranged to rotationally bias the base member relative to the bicycle frame 11.

The fastener 34 basically includes a mounting bolt 36 and a washer member 38. The mounting bolt 36 includes an enlarged head 36a with a hexagonal bore, an unthreaded shaft section 36b and a threaded shaft section 36c. The unthreaded shaft section 36b rotatably supports the main body 30, while the threaded shaft section 36c is threadedly attached within a threaded hole of the derailleur mounting plate 11a. The washer member 38 is disposed between the enlarged head 36a of the mounting bolt 36 and the main body 30. The washer member 38 is preferably constructed of a lightweight, rigid, low friction material such as synthetic resin, plastic or any other suitable material that is known in the bicycle art. The mounting bolt 36 is preferably constructed of a lightweight, rigid, metallic material such as chrome-moly steel or any other suitable metallic material that is known in the bicycle art.

The bushing 32 surrounds portions of the shaft sections 36b and 36c. The bushing 32 is preferably a tubular member with one axial end adjacent the main body 30. An opposite axial end of the bushing 32 contacts the derailleur mounting plate 11a of the frame 11. The bushing 32 is preferably constructed of a lightweight, rigid, low friction material such as synthetic resin, plastic or any other suitable material that is known in the bicycle art.

Figure 6:
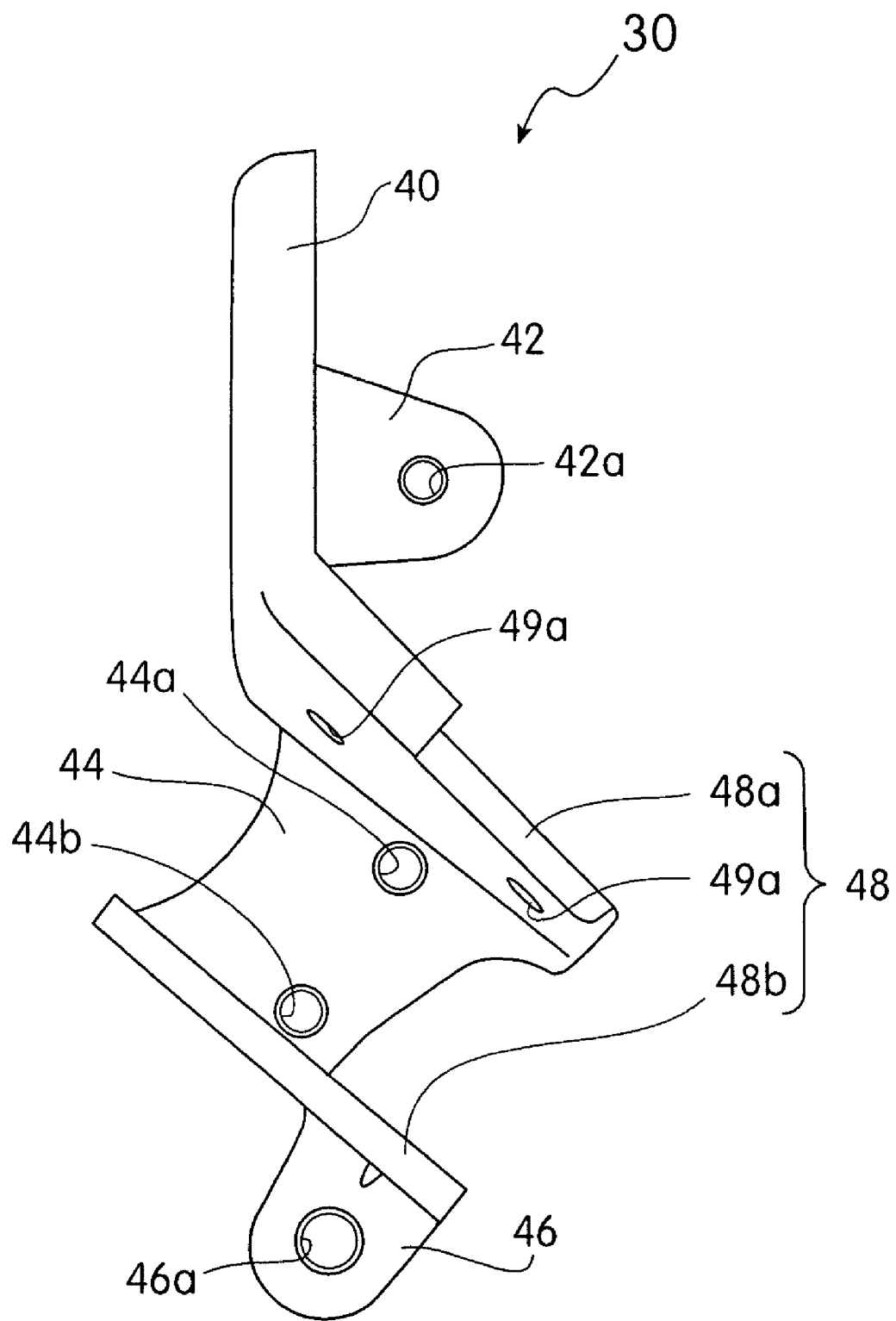
FIG. 6 is a front view of the main body of the base member of the rear derailleur illustrated in FIGS. 2-5.
Figure 7:
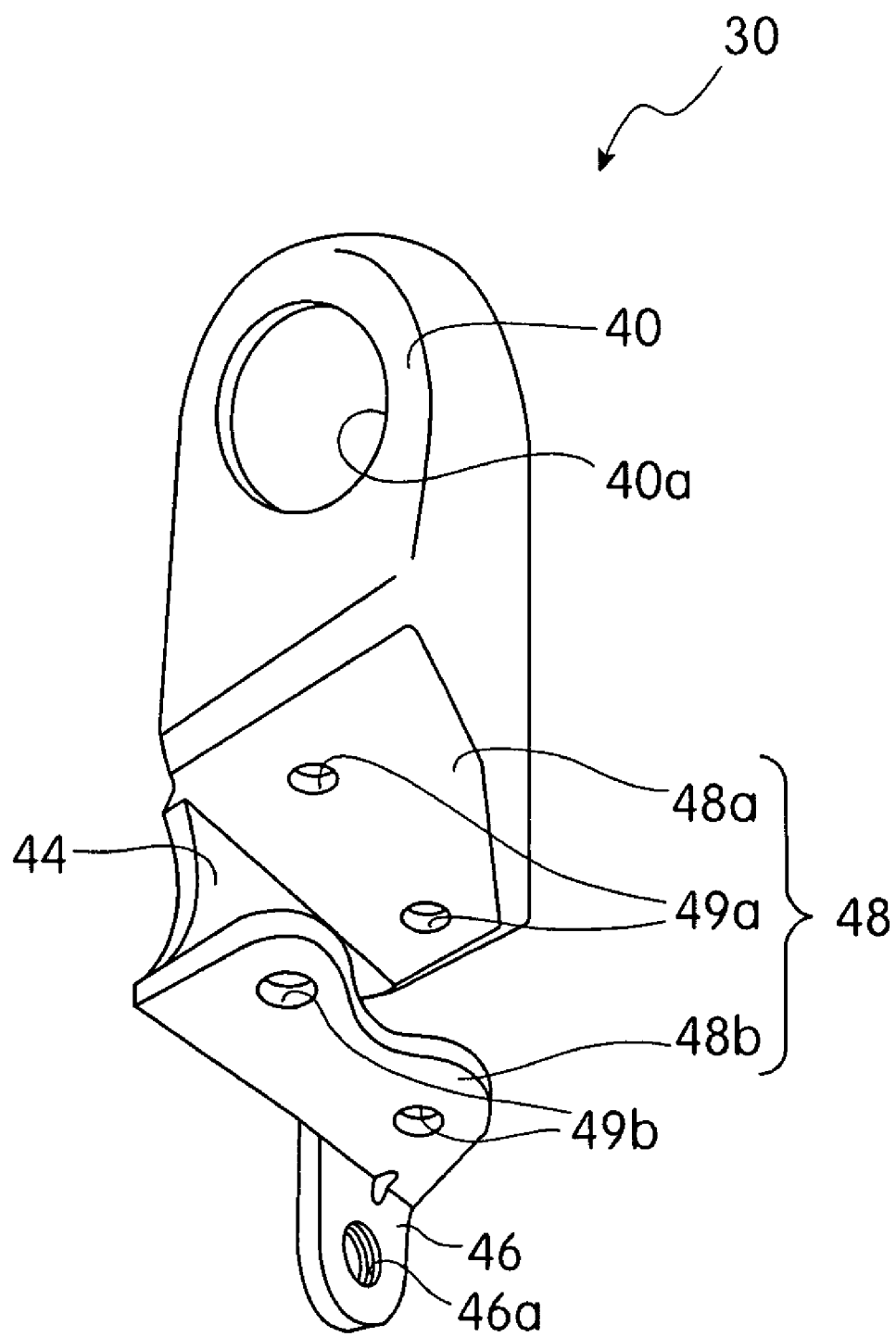
FIG. 7 is first (forward/outside/lower) perspective view of the main body of the base member illustrated in FIG. 6.
Figure 8:
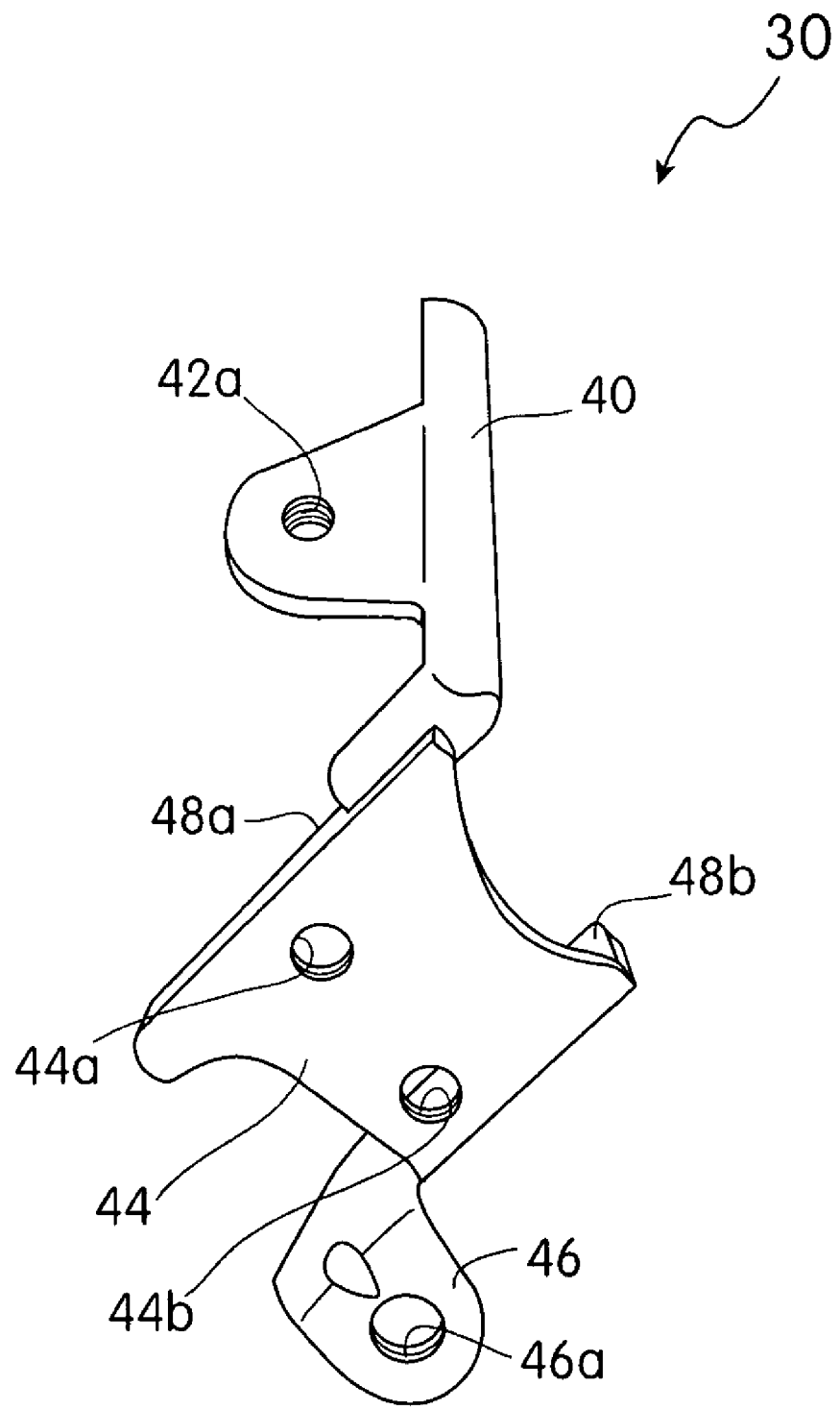
FIG. 8 is a rear view of the main body of the base member illustrated in FIGS. 6 and 7.
Figure 9:
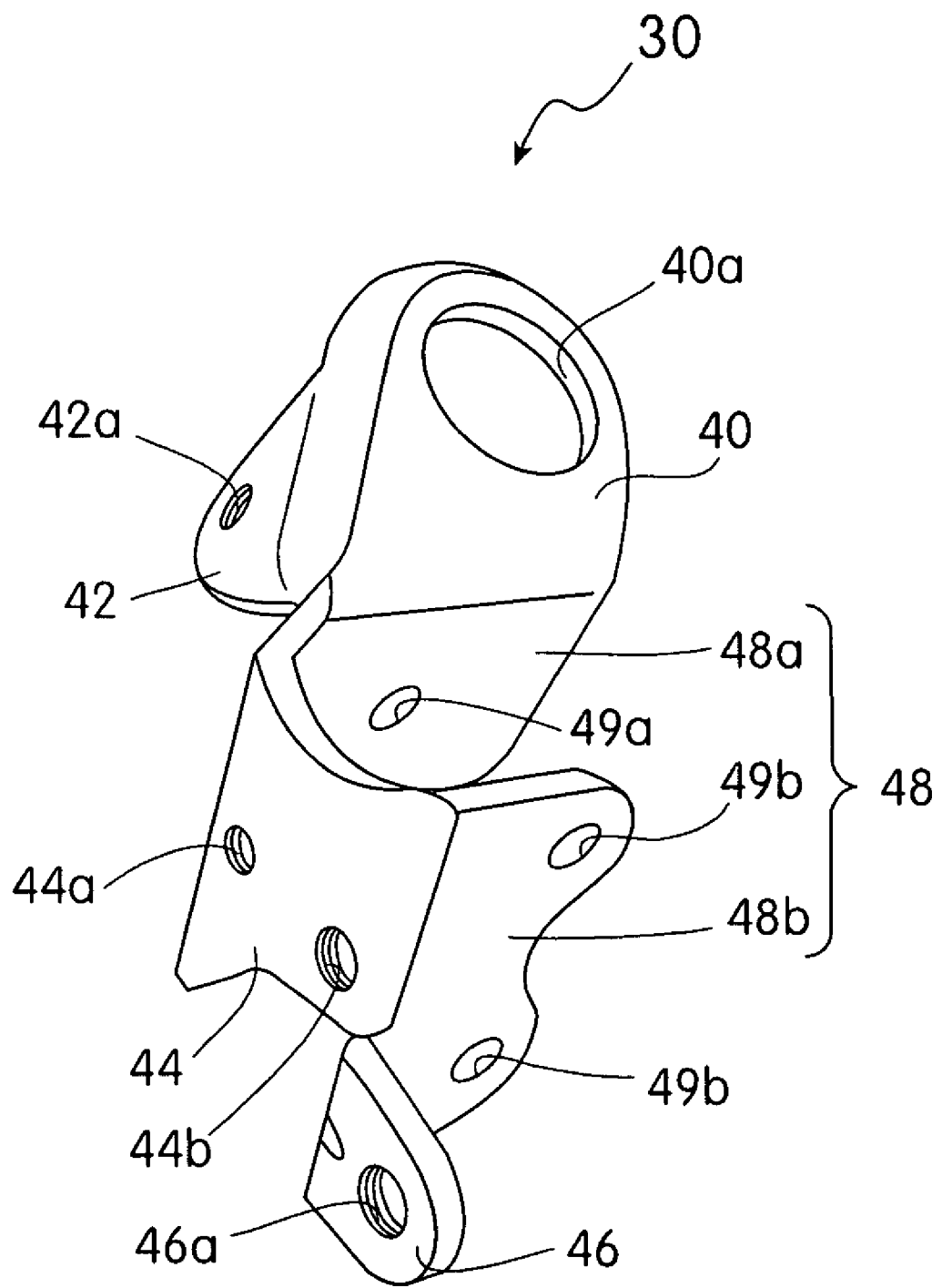
FIG. 9 is a second (rearward/outside/lower) perspective view of the main body of the base member illustrated in FIGS. 6-8.

Referring now to FIGS. 2-9, the main body 30 basically includes a main mounting portion 40, an angular position adjustment mounting structure 42, a stroke adjustment mounting structure 44, an outer casing adjustment mounting structure 46 and a linkage support portion 48. The main mounting portion 40, the angular position mounting structure 42, the stroke adjustment mounting structure 44, the outer casing adjustment mounting structure 46 and the linkage support portion 48 are preferably integrally formed together as a one-piece, unitary member from a lightweight, rigid metallic material such as chrome-moly steel or any other suitable metallic material that is well known in the bicycle art. Preferably, the main body 30 is constructed of a sheet metal material that is punched, bent (deformed) and/or machined to form the configuration disclosed and illustrated herein. In any case, the main body 30 preferably includes a metal plate that is a one-piece member forming the angular position mounting structure 42, the stroke adjustment mounting structure 44, the outer casing adjustment mounting structure 46.

The linkage support portion 48 includes a pair of parallel plates 48a and 48b having a pair of holes 49a and 49b formed therein, respectively, which are configured and arranged to receive pivot pins 50 therein. The pivot pins 50 are used to pivotally attach the linkage assembly 24 to the derailleur support portion 48 of the main body 30. The stroke adjustment mounting structure 44 includes a metal plate section extending between the parallel plates 48a and 48b to form a U-shaped configuration. The stroke adjustment mounting structure 44 includes a pair of threaded through holes 44a and 44b. The main mounting portion 40 includes a metal plate section extending from the parallel plate 48a and having a main mounting through hole 40a. The main mounting hole 40a receives the mounting bolt 36 therethrough. The angular position adjustment mounting structure 42 includes a metal plate section extending from the main mounting portion 40 and having a threaded through hole 42a. The outer casing adjustment mounting structure 46 includes a metal plate section extending from the parallel plate 48b and having a threaded through hole 46a. In any case, each of the stroke adjustment mounting structure 44, the angular position adjustment mounting structure 42 and the outer casing adjustment mounting structure 46 includes at least one through hole formed in the metal plate with the through holes having center axes that are orthogonal relative to the main pivot axis X.

The base member 20 preferably includes an angular position adjustment member 52, a pair of stroke adjustment members 54a and 54b, and an outer casing adjustment member 56 coupled thereto. In particular, the main body 30 preferably has all three of the angular position adjustment member 52, the stroke adjustment members 54a and 54b, and the outer casing adjustment member 56 threadedly coupled thereto. The angular position adjustment member 52 is preferably a threaded bolt or screw that is threadedly attached within the threaded through hole 42a of the angular position mounting structure 42. The stroke adjustment members 54a and 54b are preferably threaded bolts or screws that are threadedly attached within the threaded through holes 44a and 44b, respectively, of the stroke adjustment mounting structure 44. The outer casing adjustment member 56 is preferably a barrel adjuster having a threaded shaft that is threadedly attached within the threaded through hole 46a of the outer casing adjustment mounting structure 46.

The angular position adjustment member 52, the threaded through hole 42a of the angular position mounting structure 42 and the derailleur mounting plate 11 constitute parts of an angular position adjustment device of the rear derailleur 12. The free end of the angular adjustment member 52 normally contacts a flange 11b of the derailleur mounting plate 11a such that rotating the angular adjustment member 52 within the threaded through hole 42a changes the angular orientation of the main body 30 of the base member 20 relative to the frame 11 of the bicycle 10.

The stroke adjustment members 54a and 54b, the threaded through holes 44a and 44b of the stroke adjustment mounting structure 44, the linkage assembly 24 and an optional anti-loosening plate 55 constructed of plastic or the like constitute parts of a stroke adjustment device of the rear derailleur 12. In particular, the stroke adjustment member 54a is a high (top) position adjuster that selectively contacts a part of the linkage assembly 24 to control the top (outermost) shift position of the chain guide 26, while the stroke adjustment member 54b is a low (bottom) position adjuster that selectively contacts a part of the linkage assembly 24 to control the low (innermost) shift position of the chain guide 26. The optional anti loosening plate 55 has threaded holes that frictionally engage the threads of the stroke adjustment members 54a and 54b to prevent undesirable rotation thereof.

The outer casing adjustment member 56 and the threaded through hole 46a of the outer casing adjustment mounting structure 46 constitute parts of an outer casing adjustment device of the rear derailleur 12. In particular, the axial position of the barrel adjuster of the outer casing adjustment member 56 can be adjusted by rotating the threaded shaft within the threaded through hole 56. The outer casing 13b is received in a recess formed in the free end of the barrel adjuster, while the inner wire 13a is received through the barrel adjuster in a conventional manner. Thus, fine adjustments in the cable tension can be adjusted by rotating the outer casing adjustment member 56 in a relatively conventional manner. The barrel adjuster of the outer casing adjustment member 56 can be constructed of one or more pieces in a conventional manner. In other words, the barrel adjuster may optionally include a conventional anti-loosening structure.

Referring again to FIGS. 2-5, the linkage assembly 24 will now be explained in more detail. The linkage assembly 24 basically includes a pair of parallel links 60 and 62 as well as a portion of the main body 30 (i.e., the linkage support portion 48) and a portion of the movable member 22 to form a four bar linkage. The link 60 is an upper/outer link, while the link 62 is a lower/inner link. The high stroke adjustment member or screw 54a selectively contacts a protrusion (not shown) of the lower/inner link 62 to adjust the top position of the chain guide 26. On the other hand, the low stroke adjustment member screw 54b selectively contacts a protrusion (not shown) of the upper/outer link 60 to adjust the low position of the chain guide 26.

The links 60 and 62 are pivotally coupled to the parallel plates 48a and 48b of the main body 30 and the movable member 22 using four of the pivot pins 50, as best seen in FIGS. 2-5. The pivot pins 50 are preferably slanted with respect to a vertical line/plane. The pivot pins 50 can be press-fitted or riveted (deformed) in the holes 49a and/or 49b to be retained therein. Alternatively, retainers such as C-clips or E-clips can be used to retain the pivot pins 50. The biasing member 28 has its ends mounted on diagonally opposed pivot pins 50 to bias the movable member 22 and the chain guide 26 toward the top (outer most, smallest) sprocket of the rear sprocket assembly RS, as best understood from FIGS. 2, 4 and 5. The upper/outer link 60 includes a cable attachment device 64 that extends from the lower side thereof. The cable attachment device 64 includes a cable attachment bolt 66, a cable attachment plate 68 and a cable attachment nut 70 in order to fixedly attach the inner wire 13a to the upper/outer link 60.

The inner wire 13a is fixedly attached to the cable attachment device 64 of the upper/outer link 60 such that pulling the inner wire 13a by the rear shift control device 18 moves the linkage assembly 24 to move the movable member 22 and the chain guide 26 laterally inwardly against the biasing force of the spring 28, and releasing the inner wire 13a causes the linkage assembly 24 to move the movable member 22 and the chain guide 26 laterally outwardly due to the biasing force of the spring 28. Of course, it will be apparent to those skilled in the bicycle art from this disclosure that this arrangement could be reversed if needed and/or desired.

Referring again to FIGS. 2-5, the movable member 22 and the chain guide 26 will now be explained in more detail. The movable member 22 is movably coupled to the base member 20 via the linkage assembly 24. Specifically, the movable member 22 is pivotally coupled to the links 60 and 62 of the linkage assembly 24 using two of the pivot pins 50 in a manner similar to the connections between the base member 20 and the links 60 and 62. The chain guide 26 is pivotally coupled relative to the movable member 22. However, the chain guide 26 normally moves laterally together with the movable member 22.

The movable member 22 basically includes a movable housing 72, a link attachment portion 74, a pivot axle or shaft 76 and a biasing member or spring 78. The pivot axle 76 is attached to the movable housing 72 to pivotally support the chain guide 26. Specifically, one end of the pivot axle 76 is attached within the movable housing 72 via a C-clip or E-clip 77, while the other end of the pivot axle 76 is attached to the chain guide 26 using a nut attached to a threaded free end of the pivot axle 76. The spring 78 mounted about the pivot axle 76 within the movable housing 72. The spring 78 is a torsion spring with one end engaged with the movable housing 72 and the other end engaged with the chain guide 26 to apply a rotational biasing force to the chain guide 26 relative to the movable member 22. A pair of annular plates or washer members, which are axially disposed between the chain guide 26 and a flange of the pivot axle 76, are mounted on the pivot axle 76 adjacent the chain guide 26.

The chain guide 26 basically includes a first cage plate 80, a second cage plate 82, a guide pulley 84 and a tension pulley 86. The guide pulley 84 and the tension pulley 86 are rotatably coupled between the first and second cage plates 80 and 82. In the illustrated embodiment, the rotation axis of the guide pulley 84 is coincident with the pivot axis of the pivot axle 76. In fact, the guide pulley 84 is freely rotatably mounted on a free end of the pivot axle 76. Thus, the pivot axle couples the cage plates 80 and 82 at the guide pulley. An additional mounting screw 88 rotatably supports the tension pulley 86, and attaches the cage plates 80 and 82 together at the location of the tension pulley 86.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rear derailleur comprising:
a base member having a mounting portion configured to be pivotally mounted to a bicycle portion about a main pivot axis, the base member being formed of a metal plate that includes the mounting portion, a linkage support portion, a stroke adjustment mounting structure, an angular position adjustment mounting structure including a threaded through hole formed in the metal plate to receive an angular position adjustment member, and an outer casing adjustment mounting structure with the angular position adjustment mounting structure adjusting an angular orientation of the base member with respect to the bicycle portion about the main pivot axis, such that the mounting portion, the linkage support portion, the stroke adjustment mounting structure, the angular position adjustment mounting structure and the outer casing adjustment mounting structure are integrally formed as a one-piece unitary member;
a movable member movably coupled to the linkage support portion of the base member; and
a chain guide coupled to the movable member.

2. The bicycle rear derailleur as set forth in claim 1, wherein
the stroke adjustment mounting structure includes a pair of first threaded through holes formed in the metal plate.

3. The bicycle rear derailleur as set forth in claim 2, wherein
the angular position adjustment mounting structure includes a second threaded through hole formed in the metal plate.

4. The bicycle rear derailleur as set forth in claim 3, wherein
the outer casing adjustment mounting structure includes a third threaded through hole formed in the metal plate.

5. The bicycle rear derailleur as set forth in claim 4, further comprising
a pair of stroke adjustment members threadedly coupled within the pair of first threaded through holes formed in the metal plate;
an angular position adjustment member threadedly coupled within the second threaded through hole formed in the metal plate; and
an outer casing adjustment member threadedly coupled within the third threaded through hole formed in the metal plate.

6. The bicycle rear derailleur as set forth in claim 2, further comprising
a pair of stroke adjustment members threadedly coupled within the pair of first threaded through holes formed in the metal plate.

7. The bicycle rear derailleur as set forth in claim 1, further comprising
an angular position adjustment member threadedly coupled within the threaded through hole formed in the metal plate.

8. The bicycle rear derailleur as set forth in claim 1, wherein
the outer casing adjustment mounting structure includes a threaded through hole formed in the metal plate.

9. The bicycle rear derailleur as set forth in claim 8, further comprising
an outer casing adjustment member threadedly coupled within the threaded through hole formed in the metal plate.

10. The bicycle rear derailleur as set forth in claim 1, wherein
the base member has a main attachment opening extending along the main pivot axis with the main attachment opening receiving a mounting bolt when attached to the bicycle portion.

11. The bicycle rear derailleur as set forth in claim 10, wherein
the base member includes a bushing arranged adjacent the main attachment opening to effectively increase the thickness of the metal plate at the main attachment opening.

12. The bicycle rear derailleur as set forth in claim 10, wherein
the base member does not include a biasing member coupled thereto such that the base member is not rotationally biased about the main pivot axis relative to the bicycle portion when mounted thereto.

13. The bicycle rear derailleur as set forth in claim 12, wherein
each of the stroke adjustment mounting structure, the angular position adjustment mounting structure and the outer casing adjustment mounting structure includes at least one through hole formed in the metal plate with the through holes having center axes that are orthogonal relative to the main pivot axis.

14. The bicycle rear derailleur as set forth in claim 1, wherein
the linkage support portion includes two parallel plate sections of the sheet metal material, each of the parallel plate sections provided with a pair of link supporting holes.

15. The bicycle rear derailleur as set forth in claim 14, further comprising
a pair of links having respective first ends pivotally installed to the link supporting holes of the linkage support portion, with the movable member being installed to respective second ends of the pair of links.

* * * * *